(12) United States Patent
Johnson

(10) Patent No.: US 6,402,796 B1
(45) Date of Patent: Jun. 11, 2002

(54) METHOD OF PRODUCING A THIN FILM BATTERY

(75) Inventor: Lonnie G. Johnson, Atlanta, GA (US)

(73) Assignee: Excellatron Solid State, LLC, Smyrna, GA (US)

( * ) Notice: Subject to any disclaimer, the term of this patent is extended or adjusted under 35 U.S.C. 154(b) by 106 days.

(21) Appl. No.: 09/633,903

(22) Filed: Aug. 7, 2000

(51) Int. Cl.$^7$ ................................................ H01M 6/00
(52) U.S. Cl. ...................... 29/623.5; 29/623.3; 429/162; 204/298.01
(58) Field of Search ............................ 29/623.5, 623.3, 29/623.1, 730, 731; 429/162, 124, 126; 118/715, 720, 721; 204/298.01

(56) References Cited

U.S. PATENT DOCUMENTS

| | | | |
|---|---|---|---|
| 3,237,078 A | 2/1966 | Mallory | 320/17 |
| 3,393,355 A | 7/1968 | Whoriskey et al. | 320/18 |
| 4,303,877 A | 12/1981 | Meinhold | 320/18 |
| 4,614,905 A | 9/1986 | Petersson et al. | 320/18 |
| 4,654,281 A | 3/1987 | Anderman et al. | 429/209 |
| 4,719,401 A | 1/1988 | Altmejd | 320/13 |
| 5,270,635 A | 12/1993 | Hoffman et al. | 320/21 |
| 5,291,116 A | 3/1994 | Feldstein | 320/4 |
| 5,314,765 A | 5/1994 | Bates | 429/194 |
| 5,336,573 A | 8/1994 | Zuckerbrod et al. | 429/252 |
| 5,338,625 A | 8/1994 | Bates et al. | 429/193 |
| 5,362,581 A | 11/1994 | Chang et al. | 429/249 |
| 5,387,857 A | 2/1995 | Honda et al. | 320/18 |
| 5,411,592 A | 5/1995 | Ovsbinsky et al. | 118/718 |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,597,660 A | 1/1997 | Bates et al. | 429/191 |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |
| 6,197,450 B1 * | 3/2001 | Nathan et al. | 429/236 |
| 6,235,425 B1 * | 5/2001 | Hanson et al. | 429/209 |

OTHER PUBLICATIONS

Journal of Power Sources, P. Fragnaud, R. Nagarajan, D.M. Schleich, D. Vujic, Thin–film cathodes for secondary lithium batteries, 1995 (No month available).

Materials Research Society, The Preparation and Characterization of Lithium Cobalt Oxide Thin Films by LPCVD, 1996 (No month available).

Journal of Power Sources, Thin film solid electrolytes and electrodes for rechargeable lithium–ion batteries, J. Schoonman, E.M. Kelder, 1997 (No month available).

Solid State Ionics, Fabrication of LiCoO2 thin film cathodes for rechargeable lithium battery by electrostatic spray pyrolysis, C.H. Chen et al., 1995 (No month available).

Journal of Materials Science, Unique porous LiCoO2 thin layers prepared by electrostatic spray deposition. C.H. Chen et al., 1996 (No month available).

* cited by examiner

*Primary Examiner*—Gabrielle Brouillette
*Assistant Examiner*—R Alejandro
(74) *Attorney, Agent, or Firm*—Baker, Donelson, Bearman & Caldwell

(57) ABSTRACT

A method of producing a battery (10) having a cathode current collector (18), a cathode (12), an electrolyte (13), an anode (14), and an anode current collector (16) is disclosed. The method commences with a substrate (11) upon which the layers of battery components are built upon. The substrate is then removed, as by sputtering, and replaced with a cathode current collector.

14 Claims, 4 Drawing Sheets

METHOD OF PRODUCING A THIN FILM BATTERY

TECHNICAL FIELD

This invention relates to thin film battery construction, and more particularly to a method of producing thin film batteries.

BACKGROUND OF THE INVENTION

Thin film lithium batteries have existed for many years. These batteries have high energy and power densities as well as the capability of being cycled thousands of times. The active battery components are a lithium intercalation metal oxide cathodes, e.g. $V_2O_5$, $LiNiO_2$, $LiMn_2O_4$ or $LiCoO_2$, and a lithium metal anode or other suitable lithium intercalation anode material separated by an electrolyte. It has been found that the high energy and power densities of lithium cathodes make them attractive as compact rechargeable power sources for application in a variety of electronic devices.

Thin film batteries are ideally suited for use within small electronic devices. Because of the requirements associated with such small electronic devices it is imperative that the battery which powers them be made as small as possible in order to provide the greatest volumetric power density. However, thin film batteries today are manufactured upon substrates of inactive material which support the other battery components during the manufacturing process. These substrates, the thinnest of which is believed to be between 5–10 microns in thickness, oftentimes amount to a large amount of the battery's volume. As such, the volumetric power density is greatly reduced due to the mere existence of these substrate.

Accordingly, it is seen that a need remains for a method of producing a thin film battery with a greater volume of active material and a minimal volume of inactive material in order to achieve a high volumetric power density. It is to the provision of such therefore that the present invention is primarily directed.

SUMMARY OF THE INVENTION

In a preferred form of the invention a method of producing a method of producing a thin film battery cell comprises the steps of providing a supporting substrate, depositing a cathode upon the substrate, depositing an electrolyte upon the cathode, and removing the substrate from the cathode.

DETAILED DESCRIPTION

Figure 1:
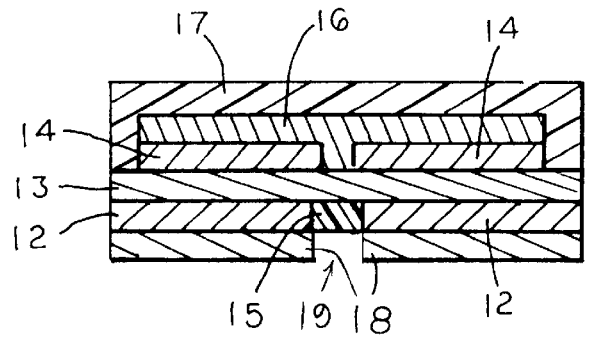
FIG. 1 is a cross-sectional view of a pair of batteries made in accordance with principles of the invention in a preferred form prior to final separation of the battery cells.

With reference next to the drawings, there is shown a pair of rechargeable, thin film lithium battery cell 10 produced in accordance with a method embodying principles of the invention in a preferred form. Each battery cell 10 has a cathode 12 made of a lithium intercalation compound, or lithium metal oxide ($LiM_xO_y$ wherein M denotes a metal and O denotes oxygen), such as $LiCoO_2$, $LiMgO_2$, $LiNiO_2$ or $LiFeO_2$. The cathodes 12 are separated from each other by an electrical insulator 15, preferably made of $SiO_2$. The cathodes 12 and insulator 15 have a solid state electrolyte 13 formed thereon, preferably made of lithium phosphorus oxynitride ($Li_xPO_yN_z$). Two anodes 14 are positioned upon the electrolyte 13 in a position over the cathodes 12 underlying the electrolyte. The anodes 14 are preferably made of silicon-tin oxynitride, SiTON, zinc nitride or tin nitride when used in lithium ion batteries, or other suitable materials such as lithium metal, or alloys such as lithium zinc, lithium tin or other metal suitable for alloying with lithium. Finally, the battery includes an anode current collector 16, preferably made of copper or nickel, and a protective layer 17, preferably of parylene, overlying the anode current collector 16. The protective layer 17 electrically insulates the anode current collector and prevents the battery components from contacting ambient air and moisture.

Figure 6:
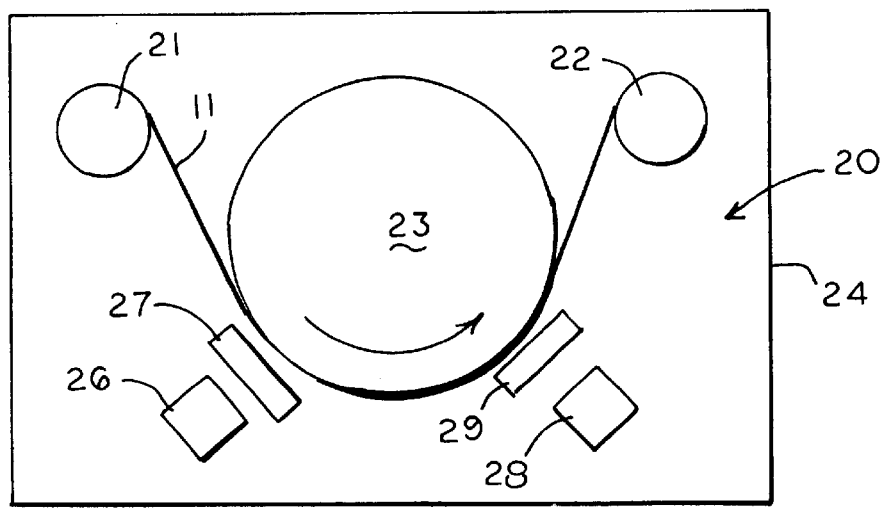
FIG. 6 is a schematic view of a first sputtering chamber utilized in manufacturing the battery of FIG. 1.
Figure 8:
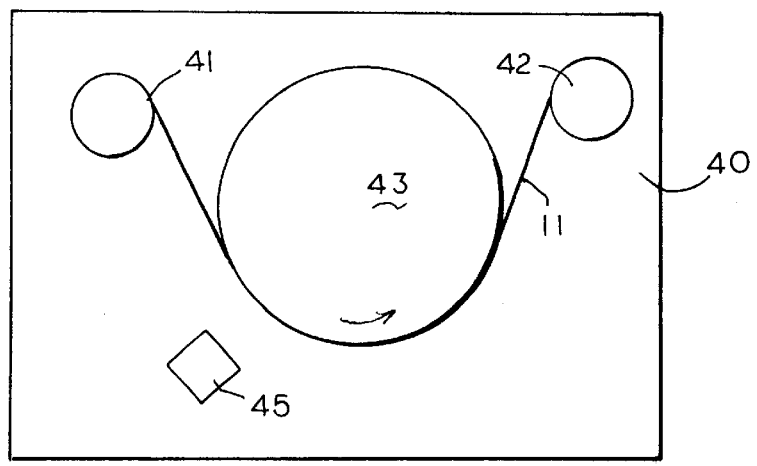
FIG. 8 is a schematic view of a second sputtering chamber utilized in manufacturing the battery of FIG. 1.
Figure 9:
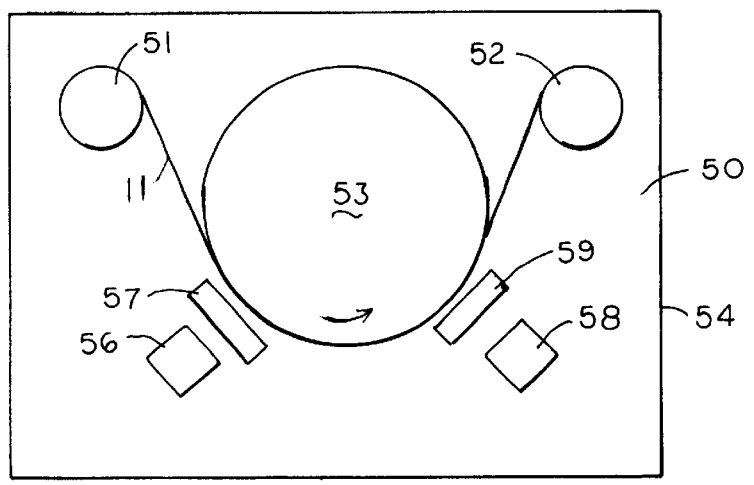
FIG. 9 is a schematic view of a third sputtering chamber utilized in manufacturing the battery of FIG. 1.
Figure 10:
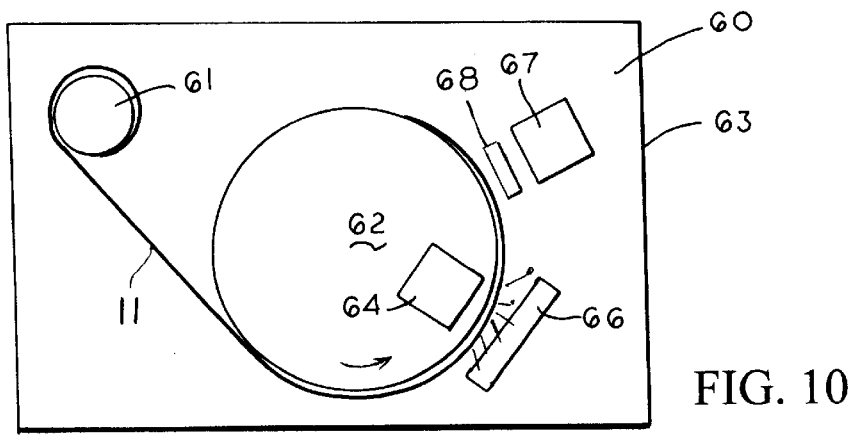
FIG. 10 is a schematic view of a fourth sputtering chamber utilized in manufacturing the battery of FIG. 1.

The inventive method of producing the previously described battery 10 utilizes a system having first sputtering chamber 20 shown in FIG. 6, an annealing chamber 30 shown in 7, a second sputtering chamber 40 shown in FIG. 8, a third sputtering chamber 50 shown in FIG. 9, and a fourth sputtering chamber 60 shown in FIG. 10. As shown in FIG. 6, the first sputtering chamber 20 includes a holding reel 21, a motorized take-up reel 22 and a motorized aligning drum 23. The holding reel 31, take-up reel 22 and aligning drum 23 are all encased within an air-tight housing 24. The first sputtering chamber 20 also includes an insulator sputtering device 26, an insulator mask 27 aligned between the insulator sputtering device 26 and the aligning drum 23, a cathode sputtering device 28, and a cathode mask 29 aligned between the cathode sputtering device 28 and the aligning drum 23. The insulator mask 27 is configured to produce the insulator 15 shown in FIGS. 1 and 2. Similarly, the cathode mask 29 is configured to produce the cathode 12 shown in FIGS. 1 and 2, so that adjacent cathodes 12 are separated by an insulator 15.

Figure 7:
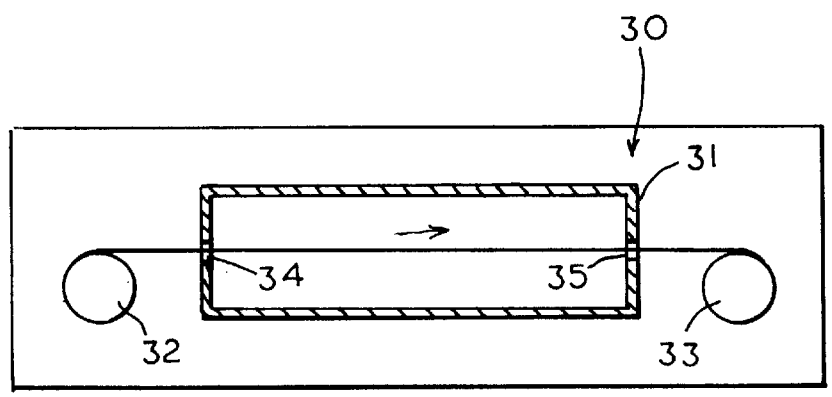
FIG. 7 is a schematic view of an annealing chamber utilized in manufacturing the battery of FIG. 1.

As shown in FIG. 7, the annealing chamber 30 includes a heating chamber 31, a holding reel 32 and a motorized take-up reel 33. The heating chamber 31 has an entry slot 34 aligned with the holding reel 32 and an exit slot 35 aligned with the take-up reel 33. The annealing chamber 30 is provided with conventional means for sustaining an annealing temperature within the heating chamber 31.

As shown in FIG. 8, the second sputtering chamber 40 includes a holding reel 41, a motorized take-up reel 42 and a motorized aligning drum 43. The holding reel 41, take-up reel 42 and aligning drum 43 are all encased within an air-tight housing 44. The second sputtering chamber 40 also includes an electrolyte sputtering device 45.

As shown in FIG. 9, the third sputtering chamber 50 includes a holding reel 51, a motorized take-up reel 52 and a motorized aligning drum 53. The holding reel 51, take-up reel 52 and aligning drum 53 are all encased within an air-tight housing 54. The third sputtering chamber 50 also includes an anode sputtering device 56, an anode mask 57 aligned between the anode sputtering device 56 and the aligning drum 53, an anode current collector sputtering device 58, and an anode current collector mask 59 aligned between the anode current collector sputtering device 58 and the aligning drum 53. The anode mask 57 is configured to produce the anode 14 shown in FIG. 4. Similarly, the anode current collector mask 59 is configured to produce the anode current collector 16 shown in FIG. 5. The anode mask 57 and anode current collector mask 59 are designed to reciprocate between a masking position closely adjacent the underlying battery components being manufactured and a retracted position distal the underlying battery components so as to allow the periodic movement of the underlying components between sputtering events.

As shown in FIG. 10, the fourth sputtering chamber 60 includes a holding reel 61 and a motorized aligning drum 62 encased within an air-tight housing 63. The fourth sputtering chamber 60 also includes a sputtering device electrode 64 mounted within the aligning drum 62, an expendable substrate plate 66 mounted externally of the aligning drum, a cathode current collector sputtering device 67, and a cathode current collector mask 68.

In use, a web of thin film battery substrate 11, preferably made of aluminum having a thickness of 5–10 microns, is positioned upon the holding reel 21 within the first sputtering chamber 20, as shown in FIG. 6. The end of the substrate web 11 is passed over the aligning drum 23 and mounted to the take-up reel 22. With the interior of the first sputtering chamber 20 filled with an argon/oxygen atmosphere and the insulator mask 27 positioned over the substrate web 11, the insulator sputtering device 26 is energized so that the insulator 15 is deposited through the insulator mask 27 and formed onto the outwardly facing surface of the substrate web 11. The take-up reel 22 and aligning drum 23 are then indexed so that the deposited insulator 15 is properly aligned with the cathode sputtering device 28 and the cathode sputtering mask 29. The cathode sputtering device 28, having an $LiCoO_2$ target or other suitable litigated metal oxide target, is then energized so that battery cathodes 12 are deposited upon the substrate web 11 to both sides of the insulators 15, the resulting product being shown in FIG. 2. This process of depositing insulators 15 and cathodes 12 continues until substantially the entire substrate web 11 is coated. The substrate web 11 is then removed from the first sputtering chamber.

With reference next to FIG. 7, the insulator and cathode coated substrate web is then mounted upon the holding reel 32 of the annealing chamber 30. The web is passed through the entry slot 34, through the heating chamber 31, through the exit slot 35 and mounted to the take-up reel 33. The coated web is then slowly passed through the heating chamber and onto the take-up reel 33. The heating chamber 31 is maintained at a select temperature and the web is passed with a select velocity to ensure that the cathodes 12 are annealed in a conventional manner. For example, a web coated with $LiCoO_2$ would be passed through the heating chamber with an interior temperature of approximately 600 degrees Celsius at a rate that would allow each portion to be annealed. The web is then removed from the annealing chamber.

Figure 3:
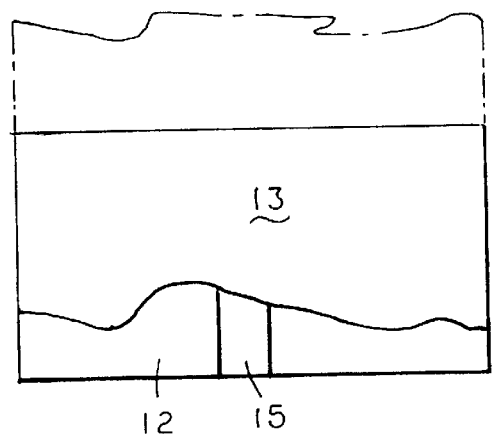

With reference next to FIG. 8, the coated web is then mounted upon the holding reel 41, passed over the aligning drum 43 and onto the take-up reel 42 of the second sputtering chamber 40. The electrolyte sputtering device 45 is energized so that a layer of LiPON electrolyte 13 is deposited and formed upon the insulators 15 and cathodes 12. The take-up reel 42 and aligning drum 43 are continuously rotated so that the entire web is passed through the second sputtering chamber 40. The resulting product is shown in FIG. 3, which shows a portion of the electrolyte removed for clarity of explanation. The web is then removed from the second sputtering chamber.

Figure 4:
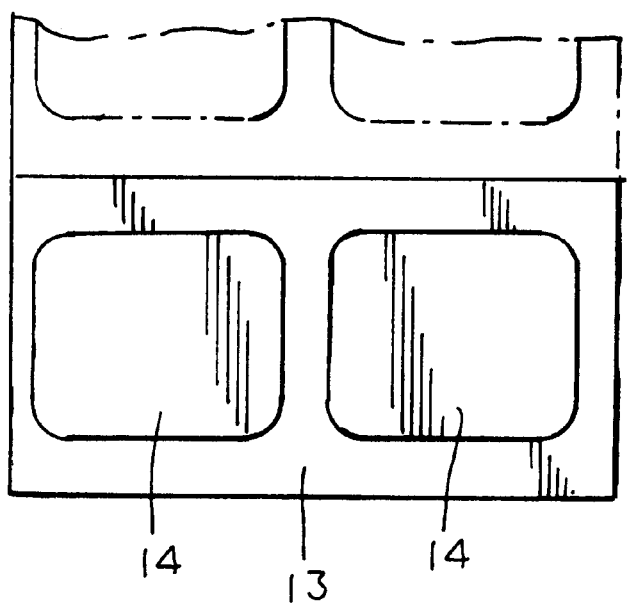

With reference next to FIG. 9, the coated web is then mounted upon the holding reel 51, passed over the aligning drum 53 and onto the take-up reel 52 of the third sputtering chamber 50. With the third sputtering chamber 50 filled with a nitrogen atmosphere and the anode sputtering mask 57 moved to its masking position, the anode sputtering device 56 having a tin or other suitable target is energized so that a layer of tin nitride anode 14 is deposited upon the electrolyte 13. The resulting product is shown in FIG. 4, with portions removed for clarity. The coated web is then removed from the second sputtering chamber.

Figure 2:
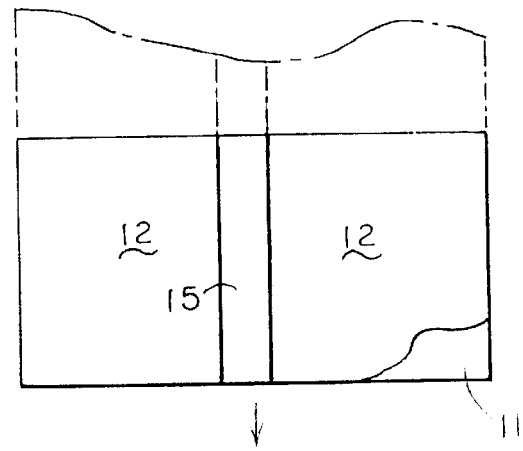
FIGS. 2–5 are a series of top views of the battery of FIG. 1 showing a sequence of the battery during the manufacturing process.
Figure 5:
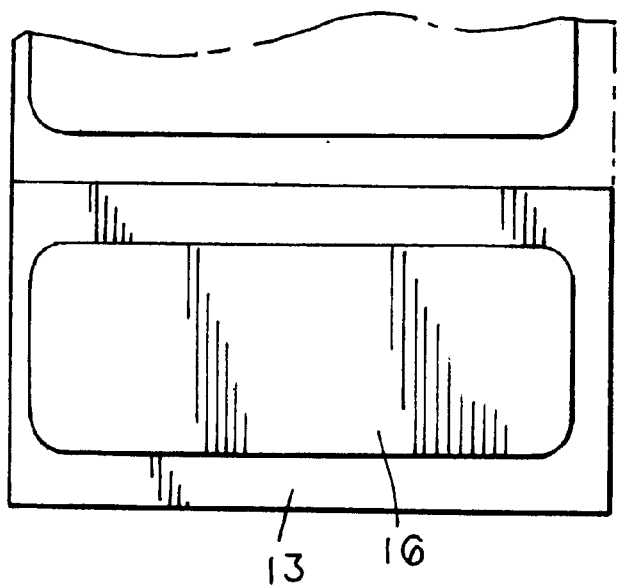

The anode sputtering mask 57 is then moved to its retracted position and the take-up reel 52 and aligning drum 53 then indexed so that the web is moved to a position with the newly formed anode 14 aligned with the anode current collector sputtering device 58. Then anode current collector sputtering mask 59 is then moved to its masking position aligned with the anode 14. Once the anode current collector sputtering mask 59 is positioned the anode current collector sputtering device 58, having a metallic target such as nickel, gold or silver, is energized so that an anode current collector 16 is deposited over and between the anodes 14, as best shown in FIGS. 1 and 5, which shows a portion of the electrolyte removed for clarity of explanation. The anode current collector sputtering device 58 may be energized simultaneously with the anode sputtering device 56 to form both battery components simultaneously. The coated web is then removed from the third sputtering chamber.

Figure 1A:
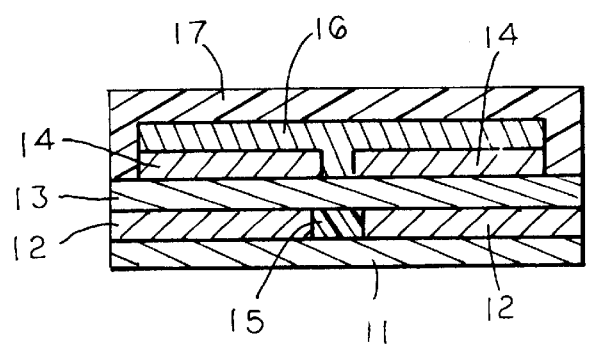
FIG. 1A is a cross-sectional view of the pair of batteries of FIG. 1 prior to removal of the substrate and depositing of the cathode current collector.

As shown in FIG. 1A, a protective coating 17 may then be deposited in any conventional manner upon the anode current collector 16 to allow later stacking of the battery cells.

The coated web is then mounted to the holding reel 61 within the fourth sputtering chamber 60. The end of the web is mounted to the aligning drum 62 with the web substrate 11 facing outwardly from the aligning drum. With the fourth sputtering chamber 60 filled with an argon atmosphere, the sputtering electrode 64 is then energized. The electromagnetic field associated with the energized electrode 64 and the gas atmosphere within the chamber causes the sputtering off of the substrate 11 from the cathodes 12 and insulators 15. As such, the substrate 11 is completely removed from the stack of underlying battery components. The sputtered substrate particles are electromagnetically collected upon the expendable substrate plate 66 to prevent the plating of the interior surfaces of the fourth sputtering chamber 60.

As the web continues about the aligning drum 62 the web passes below the cathode current collector mask 68 and adjacent the cathode current collector sputtering device 67, having a metallic target such as nickel, gold or silver, so that the cathode current collector sputtering device 67 deposits a very thin cathode current collector 18 thereon. The deposited cathode current collector is approximately 250 Angstroms thick and is formed with a space 19 directly below the insulator 15, as shown in FIG. 1.

The web may be wound upon the aligning drum 62 in such a manner so that complete battery cells 10 are stacked in alignment one upon the other. The wound web may then be cut longitudinally through the insulator 15 and through space 19 within the cathode current collector 18 and laterally between longitudinally adjacent anodes to form multi-celled battery stacks. Of course, the web may also be longitudinally and laterally cut without being wound so that one celled batteries are formed. Otherwise, individual battery cells may be formed by cutting through each insulator 15 to expose the anode and cathode edges.

As such, the 5–10 micron thick, original layer of substrate 11 is replaced with an extremely thin, 250 Angstrom thick, layer of a cathode current collector 18. This replacement of the thick substrate layer greatly increases the volumetric portion of active material as compared to the overall volume of the battery cell. As such, the volumetric energy density is greatly increased, thus enabling smaller batteries to be employed as compared with those of the prior art.

It should also be understood that the sputtering process is equivalent to other methods of chemical and physical vapor deposition, i.e. reactive sputtering or reactive evaporation, such as various chemical vapor depositions, spray pyrolysis, laser ablation, ion beam evaporation or the like. As such, as used herein the terms deposited or applied refers to any such conventional means of forming a layer. The previously described deposition or sputtering of the battery components utilize conventionally known sputtering targets and sputtering atmospheres to produce the desired battery component compounds. It should also be understood that other materials may be utilized for the web substrate such as nickel, copper, nickel-copper compounds, other metals and some polymers, such as polyethylene. Furthermore, it should also be understood that the battery cell may be formed initially without an anode, wherein the anode is later formed by plating the reactive material from the cathode, across the electrolyte and onto the anode current collector with the first charging of the battery cell. Additionally, although the preferred embodiment illustrates a web having two laterally spaced cathodes and anodes such is not intended to be a limitation of the present invention, as a battery cell made in accordance with principles of the present invention may include any number of laterally spaced cathodes and anodes.

It should also be understood that while the preferred form of the invention illustrates four separate sputtering chambers one may design a deposition system having sputtering chambers to accommodate multiple sputtering or other types of deposition devices in order to reduce the number of different sputtering chambers. Similarly, the sputtering targets may be interchanged within one chamber to produce different battery components. However, it is believed that the illustrated chambers allow the production of the different components of different webs simultaneously and at different production rates so as to produce the complete battery in the most time efficient manner.

It thus is seen that a high energy density battery is now provided which is manufacture without a thick supporting substrate. It should of course be understood that many modifications may be made to the specific preferred embodiment described herein without departure from the spirit and scope of the invention as set forth in the following claims.

What is claimed is:

1. A method of producing a portion of a thin film battery cell comprising the steps of:
    (a) providing a supporting substrate;
    (b) depositing a cathode upon the substrate;
    (c) depositing an electrolyte upon the cathode; and
    (d) removing the substrate from the cathode.

2. The method of claim 1 further comprising the step of (e) applying a cathode current collector to the cathode.

3. The method of claim 2 further comprising the step of (f) depositing an anode upon the electrolyte.

4. The method of claim 3 further comprising the step of (g) applying an anode current collector to the anode.

5. The method of claim 2 further comprising the step of (f) applying an anode current collector to the electrolyte.

6. The method of claim 1 wherein the substrate is a sputterable material and wherein step (d) the substrate is removed by sputtering the sputterable material.

7. The method of claim 6 wherein the sputterable material is a metal.

8. A method of producing a portion of a thin film battery cell comprising the steps of:
    (a) providing a substrate made of a sputterable material;
    (b) depositing a cathode upon the substrate; and
    (c) sputtering the substrate so as to substantially remove the substrate from the cathode.

9. The method of claim 8 further comprising the step of (d) applying a cathode current collector to the cathode.

10. The method of claim 8 further comprising the step of (d) depositing an electrolyte upon the cathode.

11. The method of claim 10 further comprising the step of (e) depositing an anode upon the electrolyte.

12. The method of claim 11 further comprising the step of (f) applying an anode current collector to the anode.

13. The method of claim 12 further comprising the step of (g) applying a cathode current collector to the cathode.

14. The method of claim 13 wherein step (g) the cathode current collector is sputtered upon the cathode.

* * * * *